(12) United States Patent
Joseph et al.

(10) Patent No.: US 12,527,466 B2
(45) Date of Patent: Jan. 20, 2026

(54) OPTIC LIGHT GUIDE, ENDOSCOPE, METHOD FOR PRODUCING AND USING AN OPTIC LIGHT GUIDE

(71) Applicant: Intuitive Surgical Operations, Inc., Sunnyvale, CA (US)

(72) Inventors: Hannes Joseph, Bahlingen (DE); Philip Stengel, Emmendingen (DE); Ralf Kleiser, Freiburg (DE); Björn Kuhwe, Freiburg (DE); Sebastian Petsch, Denzlingen (DE)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 555 days.

(21) Appl. No.: 17/624,004

(22) PCT Filed: Jul. 2, 2020

(86) PCT No.: PCT/US2020/040623
§ 371 (c)(1),
(2) Date: Dec. 30, 2021

(87) PCT Pub. No.: WO2021/003345
PCT Pub. Date: Jan. 7, 2021

(65) Prior Publication Data
US 2022/0287555 A1 Sep. 15, 2022

(30) Foreign Application Priority Data
Jul. 4, 2019 (EP) .................................... 19184544

(51) Int. Cl.
*A61B 1/07* (2006.01)
*A61B 1/00* (2006.01)
(Continued)

(52) U.S. Cl.
CPC .............. *A61B 1/07* (2013.01); *A61B 1/0011* (2013.01); *G02B 6/06* (2013.01); *G02B 6/40* (2013.01)

(58) Field of Classification Search
CPC ... A61B 1/07; A61B 1/00013; A61B 1/00117; A61B 1/00165; A61B 1/00167;
(Continued)

(56) References Cited

U.S. PATENT DOCUMENTS 3,901,220 A 8/1975 Koyasu et al.
6,385,371 B1 5/2002 Li
(Continued)

FOREIGN PATENT DOCUMENTS

| CN | 105491938 A | 4/2016 |
|---|---|---|
| DE | 2337591 A1 | 2/1974 |

(Continued)

OTHER PUBLICATIONS

For REf (Year: 1982).*
(Continued)

*Primary Examiner* — Robert J May

(57) ABSTRACT

An optic light guide includes a plurality of light-guiding single fibres which are combined into a bundle and at least one sheath which encloses at least one section of an outer circumference of the bundle, the at least one sheath being made of ceramic. The optic light guide may be arranged in an area of a tip of an endoscope.

9 Claims, 2 Drawing Sheets

Figure 1:
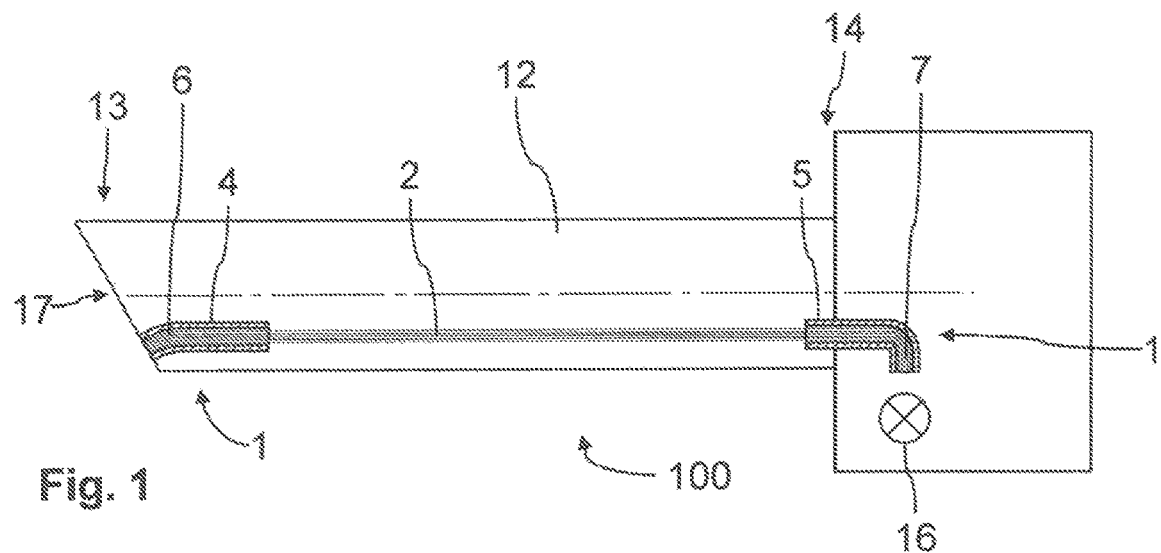

(51) Int. Cl.
*G02B 6/06* (2006.01)
*G02B 6/40* (2006.01)

(58) Field of Classification Search
CPC ... A61B 1/0017; A61B 1/0661; A61B 1/0669; G02B 6/06; G02B 6/40; G02B 23/2469; G02B 23/2476; G02B 23/26; G02B 6/241
See application file for complete search history.

(56) References Cited

U.S. PATENT DOCUMENTS

| | | | |
|---|---|---|---|
| 6,840,909 B2 | 1/2005 | Gatto | |
| 7,824,330 B2 | 11/2010 | Melanson | |
| 2002/0077550 A1* | 6/2002 | Rabiner | A61N 7/022 600/411 |
| 2004/0126071 A1 | 7/2004 | Henze et al. | |
| 2005/0234436 A1* | 10/2005 | Baxter | A61B 18/24 606/41 |
| 2007/0123752 A1* | 5/2007 | Melanson | A61B 1/12 600/178 |
| 2010/0041952 A1 | 2/2010 | Castellucci et al. | |
| 2015/0289754 A1* | 10/2015 | Bendory | A61B 1/32 600/104 |

FOREIGN PATENT DOCUMENTS

| | | |
|---|---|---|
| DE | 10240508 A1 | 3/2004 |
| EP | 0070652 A2 * | 7/1982 |
| GB | 1356474 A | 6/1974 |
| WO | WO-2008037195 A1 | 4/2008 |
| WO | WO-2019181242 A1 * | 9/2019 ......... A61B 1/00117 |

OTHER PUBLICATIONS

International preliminary report on patentability for Application No. PCT/US2020/040623, mailed Jan. 13, 2022, 8 pages.
International Search Report and Written Opinion for Application No. PCT/US2020/040623, mailed Sep. 23, 2020, 11 pages.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
Extended European Search Report for Application No. EP24152947.8, mailed on Apr. 23, 2024, 07 pages.

* cited by examiner

OPTIC LIGHT GUIDE, ENDOSCOPE, METHOD FOR PRODUCING AND USING AN OPTIC LIGHT GUIDE

The present application is a U.S. National Stage Application under 35 U.S.C. § 371 of International Application No. PCT/US2020/040623, filed on July 2, 2020, which claims priority to EP patent application Ser. No. 19/184,544.5, filed on Jul. 4, 2019, the contents of which are hereby incorporated by reference in their entirety.

The invention relates to an optic light guide having a bundle of a plurality of light-guiding single fibres and at least one sheath covering at least one section of an outer circumference of the bundle.

The invention additionally relates to an endoscope having an optic light guide.

The invention furthermore relates to a method for producing an optic light guide.

Lastly, the invention relates to the use of an optic light guide for the purpose of guiding light between a proximal end of the shaft and a distal end of the shaft.

Light guides of the kind referred to above are already known. They are used in endoscopes for the purpose of guiding light of a light source from a proximal end to a distal end of the endoscope shaft to illuminate a spot in a cavity that is to be examined; for example. Alternatively, light guides can guide images that are captured at the front of the endoscope (field of view) to an image sensor at the proximal end of the endoscope (e.g. in the handle of the endoscope). In this case, the light guides are guiding light reflected from the tissue to the imager.

For the purpose of producing the optic light guides, it has become common practice to firmly enclose bundles consisting of a plurality of light-guiding single fibres by means of a sheath, which allows the single fibres to be packed with the maximum density possible. Subsequently, if the sheath is an end sheath, for example, the bundle can be trimmed to the desired length and abraded and/or polished to form an even end. The sheath thus constitutes a fibre sleeve of the optic light guide.

However, a recurring problem of existing optic light guides is that they take up a relatively large amount of installation space, for example when they are installed in an endoscope. Since endoscopes are often introduced into narrow cavities to examine them, it is desirable to design endoscopes with an endoscope shaft that is as narrow (or as thin) as possible. As light guides are arranged along the longitudinal axis of the endoscope shaft, a diameter of the shaft is defined to a significant extent by the thickness of the optic light guide.

At the same time, however, the weight of the optic light guide is to be kept as low as possible, as a user usually also has to lift the weight of the optic light guide installed in the endoscope, for example, when using the endoscope. In addition, the invention may provide on occasion for an alignment of the front face (light entry surface and/or light exit surface) being formed by the light guide in the area of an endoscope tip that is not perpendicular to the longitudinal axis of the light guide or the endoscope shaft, but transversally (or at an angle) to the light guide or the endoscope shaft. In this connection, reflection surfaces such as mirrors are often used which, however, take up additional installation space and sometimes increase the overall weight of the optic light guide.

An object of at least some embodiments of the invention is to improve the properties of use of previously known optic light guides and/or endoscopes of the kind mentioned above.

According to the invention, an optic light guide according to claim 1 is provided. In particular, according to the invention, an optic light guide of the kind mentioned above is provided, wherein the at least one sheath is made of ceramic. This has the advantage that a shape can be selected very easily, and that the material of the sheath is solid and hard enough to provide stability and robustness. Moreover, ceramic sheaths have a surface which is relatively smooth compared with other materials (such as metal) and which facilitates the insertion of single fibres as a bundle and the setting of the desired density of the bundle.

Furthermore, ceramic is an electrically non-conductive material, which means that the sheath provides additional insulation to electronic components, e.g. to an imaging module or image sensor. Therefore, additional insulators for the purpose of insulating the sheath, which would take up additional installation space, are not necessary.

Below, advantageous embodiments of the invention are described which, either alone or in combination with the features of other embodiments, can be combined optionally with the features of claim 1.

According to an advantageous embodiment, the at least one sheath can follow a non-straight course (although a straight course is also possible). For example, the sheath can follow an angled course to allow radiation at a determinable angle to the longitudinal axis of an endoscope and/or the optic light guide. Furthermore, a non-straight design of the sheath has the advantage that changes in direction of the sheath can be used to avoid obstacles. In particular in an endoscope, a non-straight design allows the installation space taken up by the optic light guide to be minimized because the changes in direction of the sheath allow the bundle of fibres to be routed round obstacles within the endoscope. This allows, in particular, endoscopes to be designed with a diameter as small as possible for introduction into particularly narrow cavities.

According to another advantageous embodiment, the optic light guide can comprise at least two sheaths, each of which comprises one section of an outer circumference of the bundle. For example, the two sheaths can each be arranged at one end of the bundle and/or close the bundle at its ends. The sheaths thus prevent the single fibres of the bundle from falling apart more effectively. Furthermore, the sheaths can be designed differently, meaning that individual alignments or changes in direction of individual sections of the bundle can be (or are) set. This furthermore allows a maximum use of existing installation space.

To keep the weight down, while at the same time ensuring adequate quality of the fibre sleeve of the bundle, part of the bundle can be designed without a sheath sleeve. In particular, the invention provides for the previously mentioned two sheaths in particular exclusively enclosing the two end sections of the bundle, while an interim (or middle) section located between the ends is designed without a sheath, i.e. without a sleeve.

In order to redirect light around one or multiple obstacles by means of the at least one sheath, the at least one sheath can comprise at least one change in direction. In order to redirect light around several obstacles, the at least one sheath can comprise at least two or more changes in direction. A change in direction within the meaning of the application can be achieved, for example, by means of a non-straight channel that is formed by the sheath and guides the bundle, for example a knee, a curve, a deflection and/or a stop. Therefore, no additional installation space is needed to redirect light around obstacles in an installation space intended for the optic light guide. In fact, the sheath can prevent the bundle from fraying out into single fibres in the area of the change in direction and/or compensate tensions in the bundle of single fibres caused by changes in direction by firmly enclosing the single fibres in this area and thus keeping them as close together as possible.

According to another advantageous embodiment, the at least one sheath can comprise a cross-section varying in shape along at least one part of its course. The shape of the cross-section can be adjusted at will depending on the given installation space situation to facilitate the redirection of light around obstacles located in the installation space. The cross-sectional area of the varying shapes of the cross-section can remain the same for the purpose of keeping the amount of guided light at as constant a level as possible. Some examples for possible cross-section shapes include: round, oval, angular, non-circular, circular and/or semi-circular.

For the purpose of keeping the single fibres of the bundle as close together as possible and filling up interspaces between the single fibres, another advantageous embodiment provides for at least one space between the single fibres enclosed by the at least one sheath being at least partially filled with an adhesive that stabilises the single fibres.

In particular, the advantageous embodiment provides for the interspaces enclosed by the sheath being completely filled with adhesive. Such adhesive may be, for example, a chemically hardenable adhesive, specifically an epoxy resin adhesive. This allows the timing of the hardening process to be controlled particularly well. In its hardened state, the adhesive is preferably transparent and/or light-guiding.

According to a further development, in order to achieve a particularly sound (or good) fixation of the bundle within the sheath, in particular without pressing the sheath after the bundle has been inserted, it can be provided that a cross-section, for example the previously mentioned cross-section, of the sheath narrows along its course. As an alternative or addition, it may also be provided that an end area of the sheath comprises a cross-sectional area that is smaller than an area located at a distance from this end area, for example a central area. This allows the bundle to be inserted into the sheath, with the single fibres of the bundle being compacted at the narrow point formed by the sheath as a result and thus being firmly enclosed (or held) by the sheath. It can thus be provided that the previously mentioned cross-sectional area of the sheath remains constant, except for the end area and/or the narrow point.

According to another aspect of the invention, an endoscope is provided comprising an optic light guide, such endoscope being the kind described and claimed herein, wherein light can be guided, or is guided during use of the endoscope, by means of the optic light guide, between a distal end of a shaft and a proximal end of the shaft. The optic light guide can be used to guide light from a light source arranged at a proximal end of the shaft to a distal end of the shaft. The optic light guide can also be used to guide light captured at the distal end of the shaft to the proximal end of the shaft. The Optic light guide allows a redirection of light around opaque obstacles in an installation space formed in a shaft, which means that no linear and/or straight arrangement of the bundle of single fibres is required or provided for in the shaft of the endoscope. This has the advantage that the total diameter of the shaft can be kept as small as possible, as less overall installation space is needed for the arrangement of the optic light guide.

The invention furthermore relates to a method for the production of an optic light guide, for example as described and claimed herein, with the optic light guide comprising a bundle of multiple light-guiding single fibres and at least one sheath comprising at least one section of an outer circumference of the bundle, with the bundle comprising single fibres being inserted into the sheath, which is made of a ceramic material. An interspace enclosed by the at least one sheath between the single fibres may be at least partially filled with an adhesive. This means that the advantages that have already been described above with respect to the embodiments of the optic light guide apply to the same extent to the method. This method thus allows the production of a robust optic light guide that takes up little installation space. Optionally, the required installation space can be further reduced by setting up changes in direction of the bundle, for example around obstacles, by means of the sheath.

Lastly, the invention relates to the use of an optic light guide, as described and claimed herein, in an endoscope. For example, it can be provided that, by means of the optic light guide, light (for illumination) is guided from a light source at a proximal end of the endoscope shaft is guided to a distal end of the shaft. As an alternative or addition, by means of the optic light guide, light captured at the distal end of the shaft can be guided to the proximal end of the shaft. In particular, a bundle of single fibres of the optic light guide can be arranged within the installation space of the shaft in a non-straight fashion, i.e. not in a straight line, in order to be able to redirect light indirectly within the installation space around opaque obstacles without wasting installation space.

Below, the invention will be described in more detail by means of a plurality of exemplary embodiments; however, the invention is not restricted to these exemplary embodiments. Further exemplary embodiments are apparent from the combination of the features of one or multiple claims with one another and/or with individual or several features of the exemplary embodiments.

Figure 2:
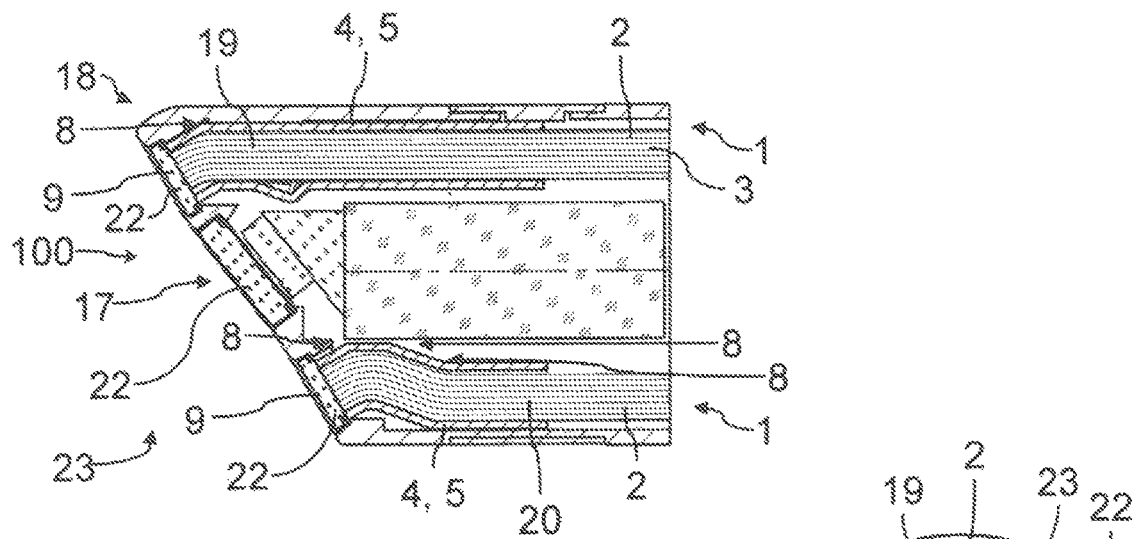
Figure 3:
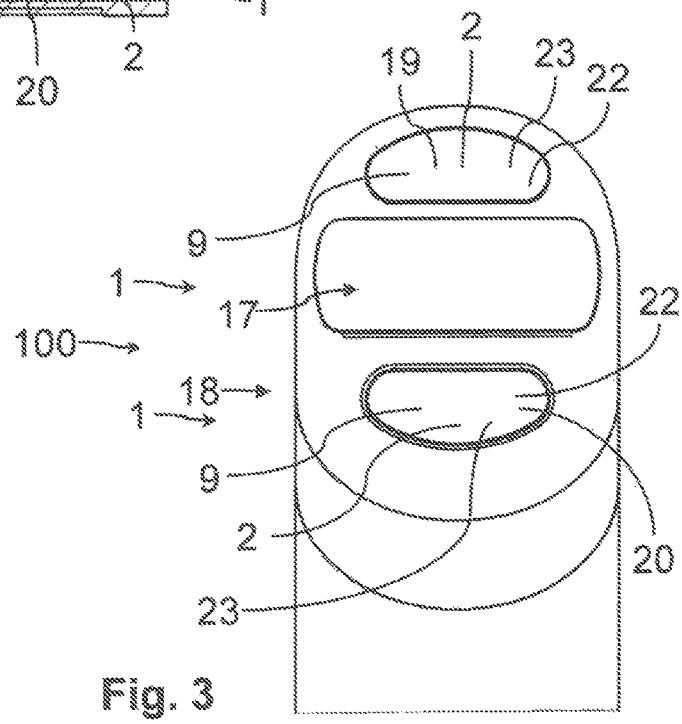
Figure 4:
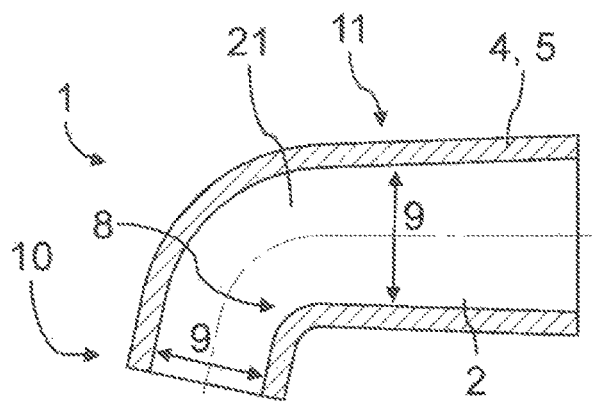
Figure 5:
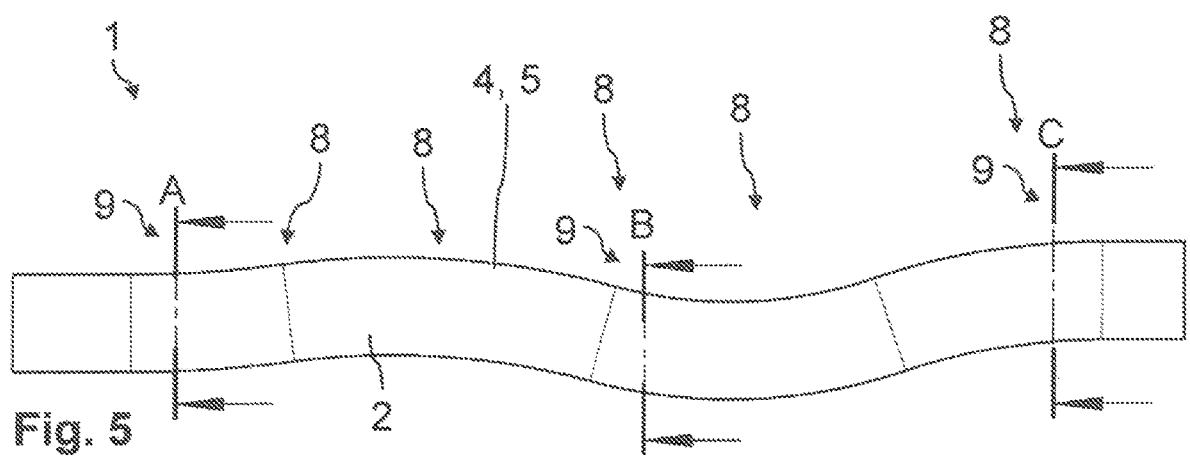
Figure 6:
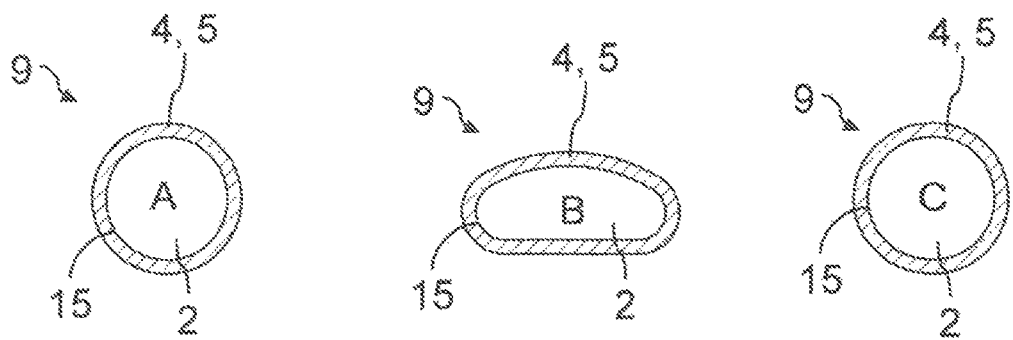

The figures show:

FIG. 1 a schematic longitudinal representation of an endoscope comprising an optic light guide, with light being guided from a light source arranged at the proximal end of a shaft to the distal end of the shaft by means of an optic light guide, FIG. 2 a longitudinal detail view of an endoscope tip having two separate optic light guides arranged at a distance from each other, between which an optical channel for image generation is arranged, with the optic light guides performing at least one change in direction each and a viewing direction of the endoscope being angled relative to the longitudinal axis of the endoscope shaft, FIG. 3 a front view of the endoscope tip from FIG. 2, wherein a light exit area formed by the optic light guides has a non-circular, specifically oval, shape, FIG. 4 a longitudinal representation of an alternative embodiment of a sheath of an optic light guide, wherein the sheath is angled downwards along its course (length) and narrows along its course, FIG. 5 a schematic representation of another alternative embodiment of a sheath of an optic light guide, wherein the sheath and/or the optic light guide comprise a plurality of changes in direction and the shapes of the cross-sections (see intersecting lines A, B and C) of the sheath change along the course of the sheath, FIG. 6 illustrates the cross-sections of the intersecting lines of the sheath marked in FIG. 5 with the letters A, B and C, wherein the shape of the cross-section of the sheath changes along its course from circular to oval to circular.

FIG. 1 shows an endoscope, which bears reference mark 100 as a whole, having an endoscope shaft 12, which comprises an optic light guide 1, 19, 20. For example, the endoscope 100 can comprise a relatively short optic module (e.g. CIT, "chip-in-tip", endoscope).

The optic light guide 1, 19, 20 is arranged along the longitudinal axis of the shaft 12 from a distal end 13 to a proximal end 14 of the endoscope shaft 12. This allows light to be guided through the endoscope shaft 12 by means of the optic light guide 1.

The optic light guide 1, 19, 20 comprises a bundle 2 consisting of a plurality of light-guiding single fibres 3, wherein the single fibres 3 are bundled, i.e. enclosed, by means of a sheath 4, 5 at least in sections. An inner guide channel 21 of the sheath 4, 5 depends on the number of single fibres in the bundle 2 and the diameter of each fibre. At least part of the guide channel 21 of the sheath 4, 5 is typically dimensioned so that the bundle 2 of single fibres is held or gripped by (or fixed to) the inner wall of the guide channel 21. As will be described further below, the inner guide channel 21 may be tapered to facilitate insertion of the fibres therein. The invention may provide for the wall thickness of the sheath 4, 5 to be as small as possible, for example a maximum value of 500 μm, in particular a maximum value of 400 μm, in particular a maximum value of 300 μm, in particular a maximum value of 200 μm, in particular a maximum value of 100 μm.

The sheath 4, 5 is made of a ceramic material in part or in full. A ceramic material allows the sheath 4, 5 to be given a particularly simple shape. At the same time, it is possible, for example by running sinter processes, which are known per se, to make the sheaths 4, 5 hard enough to achieve sufficient stability and robustness that the shape of the sheath 4, 5 does not change during installation or use. Furthermore, a ceramic sheath 4, 5 has a particularly smooth surface which allows the introduction of the single fibres 3 of the bundle 2 into the sheath 4, 5 and facilitates the attainment of a given packing density of the single fibres 3.

The invention may provide for the production of the sheath 4, 5 to be produced in what is referred to as an LCM process (Lithography based Ceramic Manufacture).

FIG. 2 shows a detail view of a longitudinal section of the tip 18 of an endoscope 100, the endoscope 100 comprising two optic light guides 19, 20 arranged at a distance from each other and along the longitudinal axis of the endoscope shaft 12.

FIG. 3 shows a top (or front) view of the tip 18 of the endoscope depicted in FIG. 2.

An optical channel 17 for image generation is arranged between the optic light guides 19, 20. By means of an optical channel 17 for image generation, images of a scene within the field of view of the endoscope 100 can be recorded and transmitted to an image sensor.

In the embodiments depicted in FIGS. 1, 2 and 3, the optic light guides 1, 19, 20 are used to guide light from a light source 16 (shown in FIG. 1) from the proximal end 14 to the distal end 13 of the shaft 12 in order to be able to illuminate the scene. Light reflected from the scene is captured by the optical channel 17 (shown in FIG. 2) for image generation. In an alternative embodiment, optic light guides 1, 19, 20 may be used to capture light from the scene and to guide the captured light from the distal end (13) of the endoscope shaft 12 to the proximal end 14 of the endoscope shaft 12.

As shown in FIGS. 1, 2, 4 and 5, the at least one sheath 4, 5 can follow a non-straight course. This means that the sheath 4, 5 and in particular the guide channel 21 formed by the sheath 4, 5 does not follow an exactly straight course, but a non-straight course. Thus, it is possible to set an angle of a direction of illumination relative to a longitudinal axis of the optic light guide 1 and/or of the shaft 12 in a particularly precise manner by means of the sheath 4, 5. Specifically, since the sheath 4, 5 is made of a hard (solid) ceramic material which does not flex during use, the orientation of the end of the bundle of single fibres can be fixed in a desired orientation because the bundle of fibres conforms to the course followed by the ceramic sheath 4, 5.

The first optic light guide 1, 19 comprises a sheath 4, 5 following an angled course, which means that an exit direction in the light exit area 23 runs transversely (at an angle) to the longitudinal axis of the shaft 12 and/or the optic light guide 1, 19.

The second optic light guide 1, 20 comprises a sheath 4, 5 following a curved course, which means that the bundle 2 is guided around an obstacle in the installation space of the shaft 12. The curved course of the sheath 4, 5 is also arranged so that an exit direction in the light exit area 23 runs transversally (at an angle) to the longitudinal axis of the shaft 12 and/or the optic light guide 1, 20. In this embodiment, the two optic light guides 19, 20 share a same exit direction.

Each optic light guide 1, 19, 20 comprises at least one sheath 4, 5. With respect to the embodiment alternative depicted in FIG. 1, the invention intends for the optic light guide 1 to comprise at least a first sheath 4 and a second sheath 5. The first sheath 4 encloses the single fibres 3 of the bundle 2 at a first end 6 of the bundle 2, and the second sheath 5 encloses the single fibres 3 of the bundle at a second end 7 of the bundle 2. An interim or middle section between the two ends 6, 7 is not enclosed by a sheath 4, 5. This helps to minimise the overall weight of the optic light guide.

As can be seen clearly in FIGS. 2 and 5, the sheath can comprise one or multiple changes in direction 8 in order to route the bundle 2 around obstacles, such as in an installation space of an endoscope shaft 12 or to achieve a desired exit direction for the light. A change in direction can be effected by giving the sheath and/or the guide channel 21 formed by the sheath 4, 5 a specific shape, for example. The specific shape can be a knee, a curve, a material stop or a spiral, for example.

FIG. 5 shows an embodiment alternative of a sheath 4, 5 comprising a plurality of changes in direction 8 so that a meandering and/or almost meandering course of the bundle 2 through the sheath 4, 5 is achieved.

Furthermore, the optic light guide 1, which is shown in FIG. 5, comprises a sheath 4, 5 having a cross-section 9 along its course that varies in shape. In particular, the cross-section 9 of the sheath 4, 5 refers at least to the cross-section of the guide channel 21 of the sheath 4, 5. FIG. 6 shows three different cross-section shapes of the cross-sections 9 of the sheath 4, with the intersecting lines depicted in FIG. 5 and marked with the letters A, B and C showing in what position the sheath 4, 5 is intersected in each case.

For example, the cross-sections A and C of the example are circular in shape, with cross-section B having an oval shape.

However, a surface area of the respective cross-sectional area of the cross-section 9, A, B and C of the sheath 4, 5 can remain the same regardless of the shape of the cross-section 9. If the cross-sectional area does remain the same, then the amount of light that can be guided is not negatively influenced by a change in the shape of the cross-section of the bundle 2. The varying shape of the cross-section can be used to make optimal use of the available installation space. For example, in narrow points a non-circular shape can be used to avoid having to make an outer diameter of the optic light guide 1 in this spot smaller.

An interspace between the single fibres 3 of the bundle 2 can be filled at least partially with an adhesive in the area enclosed by the sheath 4, 5. Said adhesive can be a chemically hardenable adhesive, for example. This makes it easier to stabilise the single fibres 3 at least in the area of the sheath 4, 5. This adhesive can also help to fix the bundle of fibres to the sheath 4, 5.

To be able to make setting a packing density of the bundle 2 by means of the sheath 4, 5 as easy as possible, the cross-section 9 of the guide channel 21 of the sheath 4, 5 can narrow along its course, as shown in FIG. 4, for example.

As an alternative or addition, at least one end area 10 of the sheath 4, 5 may comprise a cross-sectional area that is smaller than an area located at a distance from this end area 10, The area located at a distance can be a central area 11 of the sheath 4, 5, for example.

At the distal end 13 of the endoscope shaft 12, a front face defining the field of view of the endoscope tip 18 is formed (see FIG. 3). The front face in each case comprises a cover glass 22 covering the bundle 2 towards the outside that is arranged in a light exit area 23 of the bundle 2. The cover glass 22 allows hermetic sealing, for example, to prevent moisture from entering.

To be able to achieve light guidance by means of the optic light guide with as little loss as possible, the invention may provide for the end faces of the single fibres 3 of the bundle to be subjected to polishing if they are not polished already. This step can be performed prior to mounting the cover glass 22 in the light exit area 23, for example.

Here, too, the advantage of using a ceramic sheath 4, 5 is that said ceramic sheath has greater firmness and thermal resistance, which means that the end faces of the single fibres 3 can still be polished or abraded after the single fibres 3 have been enclosed by the sheath 4, 5.

Furthermore, the sheath 4, 5 itself can be revised, e.g. abraded and/or polished, more easily in a finishing step.

The invention thus relates in particular to an optic light guide 1, 19, 20 with a plurality of light-guiding single fibres 3 which are combined into a bundle 2 and at least one sheath 4, 5 which encloses at least one section of an outer circumference of the bundle, the at least one sheath 4, 5 being made of ceramic.

LIST OF REFERENCE MARKS 1 optic light guide
2 bundle
3 single fibre
4 (first) sheath
5 (second) sheath
6 first free end of the bundle
7 second free end of the bundle
8 change in direction
9 cross-section
10 end area
11 central area
12 shaft
13 distal end
14 proximal end
15 outer circumference of the bundle
16 light source
17 optical channel for image generation
18 endoscope tip
19 first light guide
20 second light guide
21 guide channel
22 cover glass
23 light exit area

What is claimed is:

1. An optic light guide comprising a bundle of light-guiding single fibres and at least one sheath which covers an outer circumference of at least one section of the bundle, characterized in that the at least one sheath is made of a hard ceramic material and is arranged within a distal end of an endoscope shaft, in an area of a front face of the endoscope, wherein the at least one sheath fixes the at least one section of the bundle to conform to a course followed by the at least one sheath within the endoscope shaft.

2. The optic light guide according to claim 1, characterized in that the at least one sheath follows a non-straight course, in particular that the sheath has at least one change of direction of a longitudinal axis of the sheath.

3. The optic light guide according to claim 1, characterized in that the optic light guide comprises at least two sheaths, said sheaths each covering one respective section of an outer circumference of the bundle, wherein a sheath is arranged at each of two ends of the bundle, wherein one of the two ends is arranged in the area of the front face of the endoscope, and an interim section of the bundle between the two ends of the bundle is not enclosed by said sheaths.

4. The optic light guide according to claim 1, characterized in that the at least one sheath has at least two or more changes in direction.

5. The optic light guide according to claim 1, characterized in that the at least one sheath comprises a cross-section that varies in shape along at least one part of a longitudinal axis of the at least one sheath.

6. The optic light guide according to claim 5, wherein the cross-sectional area of the varying shapes of the cross-section is the same.

7. The optic light guide according to claim 1, characterized in that at least one interspace enclosed by the at least one sheath between the single fibres is filled at least partially with an adhesive.

8. The optic light guide according to claim 7, wherein the adhesive comprises a chemically hardenable adhesive, preferably an epoxy resin adhesive, and stabilises the single fibres.

9. The optic light guide according to claim 1, characterized in that a cross-section of the sheath narrows along a longitudinal axis of the sheath and/or that an end area of the sheath comprises a cross-sectional area that is smaller than an area located at a distance from this end area, in particular a central area.

* * * * *